July 6, 1965     I. K. DORTORT     3,193,754
REDUCED IMPEDANCE TRANSFORMER AND RECTIFIER BUSING
Filed Jan. 17, 1963
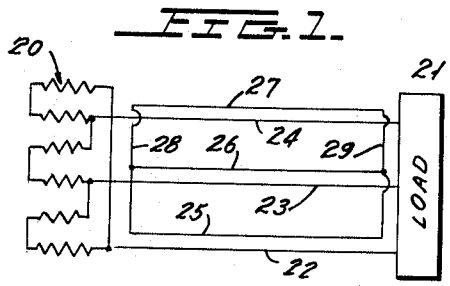
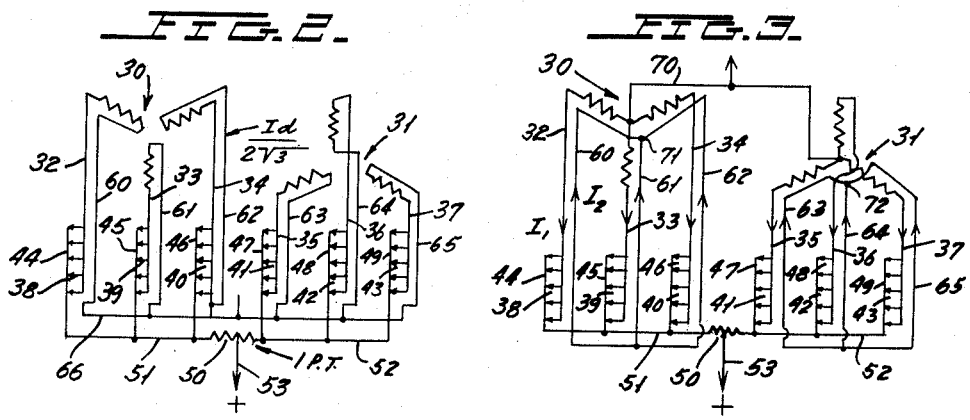
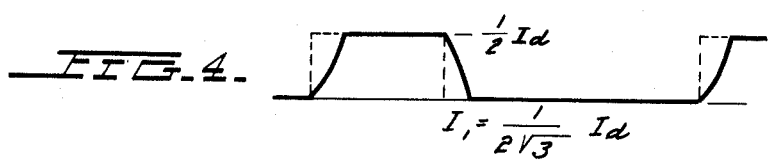
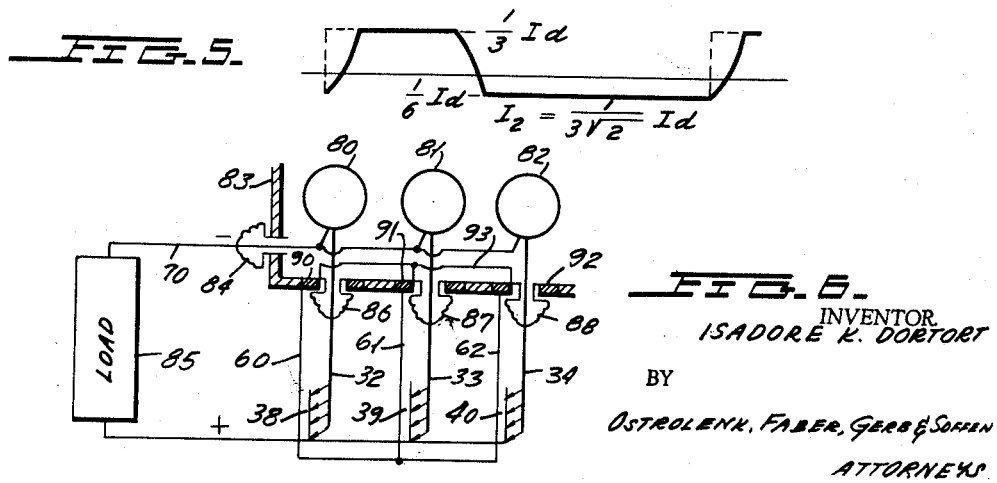
INVENTOR.
ISADORE K. DORTORT
BY
OSTROLENK, FABER, GERB & SOFFEN
ATTORNEYS

United States Patent Office 3,193,754
Patented July 6, 1965

3,193,754
REDUCED IMPEDANCE TRANSFORMER
AND RECTIFIER BUSING
Isadore K. Dortort, Philadelphia, Pa., assignor to I-T-E
Circuit Breaker Company, Philadelphia, Pa., a corporation of Pennsylvania
Filed Jan. 17, 1963, Ser. No. 252,119
10 Claims. (Cl. 321—27)

My invention relates to a novel arrangement of electrical conductors for rectifiers and transformers which provides a substantial reduction in the bus impedance of the system, and more specifically relates to a novel bus arrangement wherein a counter path for currtnt carried by the bus is placed in closest proximity to the main current carrying path throughout the bus system.

A primary object of this invention is to provide a reduction in the impedance of a rectifier system.

Another object of this invention is to reduce the leakage reactance in a transformer-rectifier system.

Yet another object of this invention is to improve the operation of a rectifier system by providing counter current carrying buses in close proximity to the main rectifier buses.

These and other objects of my invention will become apparent from the following description when taken in connection with the drawings, in which:

FIGURE 1 schematically illustrates the principles used in the present invention.

FIGURE 2 illustrates the application of the present invention to a rectifier system having open Y connected transformer windings.

FIGURE 3 illustrates a second embodiment of the invention where the system is provided with a closed counter current conducting loop.

FIGURES 4 and 5 show the current in the return and counter buses of FIGURES 2 and 3 respectively.

FIGURE 6 illustrates the manner in which the circuit of FIGURE 3 is applied to a system in which the transformer is contained within a transformer tank while the rectifier equipment is external of the tank.

The principle of the present invention is best illustrated in FIGURE 1 for the case of a transformer 20 which supplies some load 21 with A.-C. power. The transformer 20 is more specifically comprised of a delta connected secondary winding having an appropriate primary winding (not shown) wherein three main conductors 22, 23 and 24 carry current to the load 21.

It is well known to the isolated phase bus art that the reactance introduced into the system due to the relatively wide spacing of conductors 22, 23 and 24 can be decreased where a plurality of parallel conductors 25, 26 and 27 are placed adjacent conductors 22, 23 and 24 and short-circuited at their ends, as illustrated by connecting conductors 28 and 29 which connect the opposite ends of conductors 25, 26 and 27 together.

Currents will be induced in parallel buses 25, 26 and 27 in such a manner as to reduce the reactance of the bus runs 22, 23 and 24 which may be quite long and widely spaced. Thus, the conductors 25, 26 and 27 form a parallel and isolated bus system magnetically coupled to the main bus system where the isolated buses 25, 26 and 27 could be in the form of grounded sheaths around their respective main buses. Conductors 25, 26 and 27 are tied together at each end.

In a high current, low voltage rectifier system which could, for example, have an output of the order of 250 volts D.-C. at 10,000 amperes or more D.-C., reactance in the system will adversely affect regulation, power factor and rating of the rectifier transformer. That is to say, such high power, low voltage rectifiers would be essentially high power factor loads for the transformer were it not for the reactance of the busing, so that the effect of excessive reactance in the bus will be much more severe than the effect of the same reactance in the busing of a transformer supplying an A.-C. load of similar power factor such as shown in FIGURE 1.

Notwithstanding presently used techniques which minimize the reactance of the rectifier transformer and the secondary busing, the total commutating reactance of a high current rectifier may still be very high because of the conductor spacing within the rectifier structure itself.

By way of example, FIGURE 2 schematically illustrates a rectifier structure wherein the rectifying elements are semiconductor-type rectifiers connected in parallel for each arm of the rectifier. More specifically, the rectifier system of FIGURE 2 is connected to two open Y secondary windings 30 and 31 wherein the power conductor from the end of each of the Y connected transformers have outwardly extending buses 32, 33, 34, 35, 36 and 37. Each of these buses serve as a common connecting point for a respective group of parallel connected rectifier elements 38, 39, 40, 41, 42 and 43. A second bus is then provided for receiving the other end of each of the rectifier elements and is shown schematically as buses 44, 45, 46, 47, 48 and 49 respectively.

The ends of buses 44, 45 and 46 are then connected to the left-hand side of an interphase transformer 50 by means of bus 51, while buses 47, 48 and 49 each terminate on a bus 52 which is connected to the right-hand side of interphase transformer 50. A central tap 53 on the interphase transformer 50 then serves as the positive output terminal of the rectifier system.

This type of system has common and widespread use. It will be noted that the various buses are widely spaced to thereby impart a relatively high reactance to the system.

In accordance with the present invention, I have found that I can reduce the reactance of the busing and of the rectifier by running return leads parallel to and in close proximity to the secondary buses and through the rectifier. Thus, I provide six buses 60, 61, 62, 63, 64 and 65 which run parallel to the "cathode" buses 32 through 37 respectively. Each of buses 60 through 65 terminate on a lower common bus 66 which runs parallel to buses 51 and 52, while the upper ends of buses 60 through 65 are secured to the open ended winding portion of their respective phase, as illustrated.

The size of buses 60 through 65 must be sufficient to carry a current equal to $I_d/2\sqrt{3}$ where $I_d$ is equal to the output D.-C. current.

In the event that the Y connected windings 30 and 31 are closed and a single D.-C. negative bus is run to the negative terminal of the rectifier, the cross-section for such a bus would have to conduct a current equal to $I_d$.

It will be observed in FIGURE 2 that each of the long conductor bus elements are provided with a respective bus element which carries current in an opposite direction and of the same phase, thereby substantially decreasing the overall reactance of the system.

A similar rectifier arrangement is shown in FIGURE 3 wherein the return conductors are eliminated, and an isolated loop system of conductors is placed parallel to the power buses. In FIGURE 3 where all of those components similar to components of FIGURE 2 are given similar identifying numerals, it will be seen that windings 30 and 31 are connected to form a neutral to which a bus 70 is connected to form the negative output terminal of the system. The counter buses or conductors 60 through 65 are then arranged contiguous to the bus systems inside the transformer and rectifier, as illustrated, and adjacent to or inside the transformer windings 30 and 31 if their terminals are at opposite ends of the windings. The counter current flow will be as indicated by the arrows on the rectifier buses and their counter conductors, whereby a substantial reduction in leakage reactance results.

The system of FIGURE 3 is advantageous over that of FIGURE 2 in that smaller conductors may be used for the counter conductors than when used as return conductors.

Thus, referring to FIGURES 4 and 5 which illustrate current in the secondary and counter conductors of FIGURES 2 and 3 as a function of time, it will be seen that the sum of the R.M.S. currents in all six phase conductors is $\sqrt{3}I_d$. In the case of the system of FIGURE 3, however, and as illustrated in FIGURE 5 for the current in the isolated loop conductors, since a D.-C. component cannot be transformed inductively, the zero line of current is shifted so that the R.M.S. value of current in each bus is reduced to $I_d/3\sqrt{2}$. The sum of the current in all six buses is then $I_d\sqrt{2}$, which is only 81% of the total R.M.S. current in the return conductors of FIGURE 2.

Where rectifiers of the type shown in FIGURE 2 have the transformer components contained within a tank which could, for example, be filled with oil and the rectifier elements are external of the tank, it is necessary to provide twice as many bushings as in the usual case because of the return circuit conductors.

This problem may be avoided by a novel bushing arrangement schematically illustrated in FIGURE 6 wherein the transformer is schematically illustrated as transformer windings 80, 81 and 82 which are contained within a tank partially shown by tank walls 83. It will be noted that FIGURE 6 shows one of the two rectifier sections of FIGURE 3. The tank wall 83 then has a bushing 84 therein which receives bus 70 and permits bus 70 to be connected to an appropriate load 85. Three bushings 86, 87 and 88 are then provided, as schematically illustrated, for bringing conductors 32, 33 and 34 out of the tank 83 and to their rectifier elements 38, 39 and 40, respectively.

In order to avoid the necessity of a second set of bushings for counter conductors 60, 61 and 62, copper plates 90, 91 and 92 are brazed into the tank wall and could, for example, surround bushings 86, 87 and 88, respectively, and form, in effect, coaxial bushings.

A common bus 93 then interconnects plates 90, 91 and 92 with conductors 60, 61 and 62 being connected directly to plates 90, 91 and 92, respectively. Thus, the internal loop which parallels the Y connection bus of the transformer will prevent any undue high reactance due to the steel tank wall 83. Moreover, it will be seen that bushings 86, 87 and 88 may be of standard construction so that the requirement of the additional conductor passing through the tank walls introduces no special difficulty in the use of the system.

Although I have described preferred embodiments of my novel invention, many variations and modifications will now be apparent to those skilled in the art, and I prefer therefore to be limited not by the specific disclosure herein but only by the appended claims.

The embodiments of the invention in which an exclusive privilege or property is claimed are defined as follows:

1. In a multiphase rectifier system; a multiphase power transformer; a plurality of rectifier elements, and a plurality of first bus conductors electrically connecting said multiphase power transformer to said plurality of rectifier elements, and second bus conductors extending from said plurality of rectifier elements; a plurality of counter bus conductors; each of said plurality of counter bus conductors being positioned immediately adjacent a respective bus conductor of said plurality of first bus conductors, rectifier elements, and bus extensions therefrom; said plurality of counter bus conductors being connected in balanced phase groupings at their ends to permit the flow of current in each of said counter bus conductors which is substantially equal in magnitude and opposite in direction to the A.-C. component of the flow of current through their said respective first bus connectors.

2. In a multiphase rectifier system; a multiphase power transformer; a plurality of rectifier elements, and a plurality of first bus conductors electrically connecting said multiphase power transformer to said plurality of rectifier elements, and second bus conductors extending from said plurality of rectifier elements; a plurality of counter bus conductors; each of said plurality of counter bus conductors being positioned immediately adjacent a respective bus conductor of said plurality of first bus conductors, rectifier elements and bus extensions therefrom; said plurality of counter bus conductors being connected in balanced phase groupings at their ends to permit the flow of current in each of said counter bus conductors which is substantially equal in magnitude and opposite in direction to the A.-C. component of the flow of current through their said respective first bus conductors; said plurality of counter buses being completely isolated from said connecting bus conductors and being directly connected to each other at their respective ends.

3. In combination; a multiphase power transformer, a multiphase rectifier system, a plurality of buses connecting said multiphase power transformer to said multiphase rectifier system, and a plurality of reactance reducing conductors; each of said plurality of reactance reducing conductors being placed adjacent a respective bus of said plurality of connecting buses and being insulated therefrom and magnetically coupled thereto; the ends of said plurality of reactance reducing conductors being interconnected to permit current flow therein as induced by the said magnetic coupling to said connecting buses.

4. In combination; a multiphase transformer, a rectifier having multiphase A.-C. input means, and a bus system for interconnecting said multiphase transformer and said multiphase A.-C. input means of said rectifier; said bus system being comprised of a first plurality of bus conductors and a second plurality of bus conductors; each of said first plurality of buses extending from said transformer to said rectifier input means and carrying current from said transformer to said rectifier; each of said second plurality of bus conductors being positioned immediately adjacent a respective bus conductor of said first plurality of bus conductors; each of said second plurality of buses being electrically arranged with respect to one another for conducting a current in a direction opposite to the direction of current in their said respective bus of said first plurality of buses.

5. In combination; a multiphase transformer, a rectifier having a multiphase A.-C. input means, and a bus system for interconnecting said multiphase transformer and said multiphase A.-C. input means of said rectifier; said bus system being comprised of a first plurality of bus conductors and a second plurality of bus conductors; each of said first plurality of buses extending from said transformer to said rectifier input means and carrying current from said transformer to said rectifier; each of said second plurality of bus conductors being positioned immediately adjacent a respective bus conductor of said first plurality of bus conductors; each of said second plurality of buses being electrically arranged with respect to one another for conducting a current in a direction opposite to the direction of current in their said respective bus of said first pluruality of buses; each of said second buses comprising a return current carrying bus for its said respective bus of said first plurality of buses.

6. In combination; a multiphase transformer, a rectifier having multiphase A.-C. input means, and a bus system for interconnecting said multiphase transformer and said multiphase A.-C. input means of said rectifier; said bus system being comprised of a first plurality of bus conductors and a second plurality of bus conductors; each of said first plurality of buses extending from said transformer to said rectifier input means and carrying current from said transformer to said rectifier; each of said second plurality of bus conductors being positioned immediately adjacent a respective bus conductor of said first plurality of bus conductors; each of said second plurality of buses being electrically arranged with respect to one another for conducting a current in a direction opposite to the direction of current in their said respective bus of said first plurality of buses; said second plurality of buses being connected to one another at the ends thereof.

7. A dual conductor lead through structure for a tank wall comprising an opening in said tank wall, an electrically conductive member mechanically and electrically secured within said opening, an insulator bushing having a bushing conductor therein secured within said opening and insulated from said tank wall, a first and second conductor lead on one side of said tank wall and a third and fourth conductor lead on the other side of said tank wall; said first and third conductor leads being connected to said electrically conductive member; said second and fourth conductor leads being connected to said bushing conductor.

8. In combination; a multiphase transformer, a rectifier having multiphase A.-C. input means, and a bus system for interconnecting said multiphase transformer and said multiphase A.-C. input means of said rectifier; said bus system being comprised of a first plurality of bus conductors and a second plurality of bus conductors; each of said first plurality of buses extending from said transformer to said rectifier input means and carrying current from said transformer to said rectifier; each of said second plurality of bus conductors being positioned immediately adjacent a respective bus conductor of said first plurality of bus conductors; each of said second plurality of buses being electrically arranged with respect to one another for conducting a current in a direction opposite to the direction of current in their said respective bus of said first plurality of buses; said multiphase transformer being contained within a tank; said tank having a plurality of dual conductor lead through structures in a wall thereof; each of said buses of said first plurality of buses and its said respective bus of said second plurality of buses being connected to a respective dual conductor lead through structure of said plurality of lead through structures.

9. In combination; a multiphase transformer, a rectifier having multiphase A.-C. input means, and a bus system for interconnecting said multiphase transformer and said multiphase A.-C. input means of said rectifier; said bus system being comprised of a first plurality of bus conductors and a second plurality of bus conductors; each of said first plurality of buses extending from said transformer to said rectifier input means and carrying current from said transformer to said rectifier; each of said second plurality of bus conductors being positioned immediately adjacent a respective bus conductor of said first plurality of bus conductors; each of said second plurality of buses being electrically arranged with respect to one another for conducting a current in a direction opposite to the direction of current in their said respective bus of said first plurality of buses; said multiphase transformer being contained within a tank; said tank having a plurality of dual conductor lead through structures in a wall thereof; each of said buses of said first plurality of buses and its said respective bus of said second plurality of buses being connected to a respective dual conductor lead through structure of said plurality of lead through structures; each of said lead through structures comprising an opening in said tank wall, an electrically conductive member mechanically and electrically secured within said opening, an insulator bushing having a conductor therein secured within said opening and insulated from said tank wall, a first and second conductor lead comprised of one of said buses of said first plurality of buses and its said respective bus of said second plurality of buses respectively on one side of said tank wall and a third and fourth conductor lead on the other side of said tank wall; said first and third conductor leads being connected to said electrically conductive member; said second and fourth conductor leads being connected to said bushing conductor.

10. In combination; a multiphase transformer, a rectifier having multiphase A.-C. input means, and a bus system for interconnecting said multiphase transformer and said multiphase A.-C. input means of said rectifier; said bus system being comprised of a first plurality of bus conductors and a second plurality of bus conductors; each of said first plurality of buses extending from said transformer to said rectifier input means and carrying current from said transformer to said rectifier; each of said second plurality of bus conductors being positioned immediately adjacent a respective bus conductor of said first plurality of bus conductors; each of said second plurality of buses being electrically arranged with respect to one another for conducting a current in a direction opposite to the direction of current in their said respective bus of said first plurality of buses; said multiphase transformer being contained within a tank; said tank having a plurality of dual conductor lead through structures in a wall thereof; each of said buses of said first plurality of buses and its said respective bus of said second plurality of buses being connected to a respective dual conductor lead through structure of said plurality of lead through structures; each of said lead through structures comprising an opening in said tank wall, an electrically conductive member mechanically and electrically secured within said opening, an insulator bushing having a conductor therein secured within said opening and insulated from said tank wall, a first and second conductor lead comprised of one of said buses of said first plurality of buses and its said respective bus of said second plurality of buses respectively on one side of said tank wall and a third and fourth conductor lead on the other side of said tank wall; said first and third conductor leads being connected to said electrically conductive member; said second and fourth conductor leads being connected to said bushing conductor; each of said third conductor leads being electrically connected together in balanced phase groupings.

References Cited by the Examiner
UNITED STATES PATENTS 1,551,960  9/25  Kubler et al. _____ 336—145

LLOYD McCOLLUM, *Primary Examiner*